(12) United States Patent
Huang et al.

(10) Patent No.: US 8,764,357 B2
(45) Date of Patent: Jul. 1, 2014

(54) DEFLECTION CORRECTION SYSTEM FOR A MILLING MACHINE

(75) Inventors: Kun-Fang Huang, Taichung (TW); Tsair-Rong Chen, Changua County (TW); Chia-Hui Tang, Taichung (TW); Wen-Ren Yang, Taichung (TW); Paul Chang, Taichung (TW)

(73) Assignees: Buffalo Machinery Company Limited, Taichung (TW); The Department of Engineering, National Chang-Hua University of Education, Changhua County (TW)

( * ) Notice: Subject to any disclaimer, the term of this patent is extended or adjusted under 35 U.S.C. 154(b) by 576 days.

(21) Appl. No.: 13/160,125

(22) Filed: Jun. 14, 2011

(65) Prior Publication Data
US 2012/0321406 A1    Dec. 20, 2012

(51) Int. Cl.
*B23Q 15/18* (2006.01)
(52) U.S. Cl.
USPC ............................................ 409/237; 409/239
(58) Field of Classification Search
CPC ............ B23Q 15/18; B23Q 17/22; B23Q 1/72
USPC ......... 409/237–239, 134, 207, 208, 186, 187, 409/193, 194, 231
See application file for complete search history.

(56) References Cited

U.S. PATENT DOCUMENTS

| | | | |
|---|---|---|---|
| 3,045,510 A * | 7/1962 | Brainard | 408/3 |
| 3,097,568 A * | 7/1963 | Kampmeier | 409/239 |
| 3,455,207 A * | 7/1969 | Meinke | 409/239 |
| 3,656,860 A * | 4/1972 | Neuman | 408/234 |
| 4,149,822 A * | 4/1979 | Lehmkuhl | 408/235 |
| 4,808,048 A * | 2/1989 | Miller | 409/239 |

* cited by examiner

*Primary Examiner* — Daniel Howell
*Assistant Examiner* — Ryan Rufo
(74) *Attorney, Agent, or Firm* — Banner & Witcoff, Ltd

(57) ABSTRACT

A milling machine has a carriage, a main spindle seat extending along an axis, and a motor operable to drive displacement of the main spindle seat relative to the carriage along the axis. A deflection correction system includes a control unit, a displacement sensor, at least one pressure cylinder, and a pressure sensor. The pressure cylinder includes a cylinder body, and a control rod extended retractably into the cylinder body. The control unit is configured to determine a pressure range as a function of displacement detected by the displacement sensor, and to maintain fluid pressure in the pressure cylinder within a pressure range, thereby controlling the control rod via the cylinder body to position the second end portion of the main spindle seat relative to the axis.

9 Claims, 8 Drawing Sheets

DEFLECTION CORRECTION SYSTEM FOR A MILLING MACHINE

BACKGROUND OF THE INVENTION

1. Field of the Invention

The invention relates to a deflection correction system, and more particularly to a deflection correction system for a milling machine.

2. Description of the Related Art

Referring to FIG. 1, a conventional milling machine 1 includes a base 11 for supporting a work piece (A), a column 12 mounted on the base 11, a first axle seat 13 mounted to the column 12 and moveable along a Y-axis direction, a second axle seat 14 mounted to the first axle seat 13 and moveable along a Z-axis direction, a main spindle seat 15 mounted to the second axle seat 14 and moveable along an X-axis direction, and a spindle 16 extending rotatably through the main spindle seat 15 and mounted with a cutting tool (B). The cutting tool (B) may be displaced relative to the work piece (A) along the X-axis, Y-axis and Z-axis directions. However, the main spindle seat 15 of the conventional milling machine 1 may experience deformation due to gravity or other forces, and the deformation may result in manufacturing errors.

SUMMARY OF THE INVENTION

Therefore, an object of the present invention is to provide a deflection correction system for a milling machine that can automatically correct deformation to increase manufacturing precision.

An aspect of the invention is a deflection correction system for a milling machine. The milling machine has a carriage, a main spindle seat mounted on the carriage and extending along an axis, and a motor mounted on the carriage, coupled to the main spindle seat, and operable to drive displacement of the main spindle seat relative to the carriage along the axis. The deflection correction system includes a control unit, a displacement sensor, at least one pressure cylinder, and a pressure sensor.

The displacement sensor is coupled electrically to the control unit and is configured to detect displacement of the main spindle seat relative to the carriage along the axis. The pressure cylinder includes a cylinder body to be fixed to the main spindle seat and to be disposed proximate to a first end portion of the main spindle seat, and a control rod extended retractably into the cylinder body. The pressure cylinder is operable to move the control rod, and the control rod has a rod end portion distal from the cylinder body and to be fixed to a second end portion of the main spindle seat. The pressure sensor is electrically coupled to the control unit and is configured to detect fluid pressure in the pressure cylinder.

The control unit is configured to determine a pressure range as a function of the displacement detected by the displacement sensor, and to maintain the fluid pressure in the pressure cylinder within the pressure range, thereby controlling the control rod via the cylinder body to position the second end portion of the main spindle seat relative to the axis.

An advantage of the deflection correction system for a milling machine according to this invention includes increasing manufacturing precision by controlling pressure within the pressure cylinder in accordance with the displacement of the main spindle seat along the axis to position the second end portion of the main spindle seat relative to the axis.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
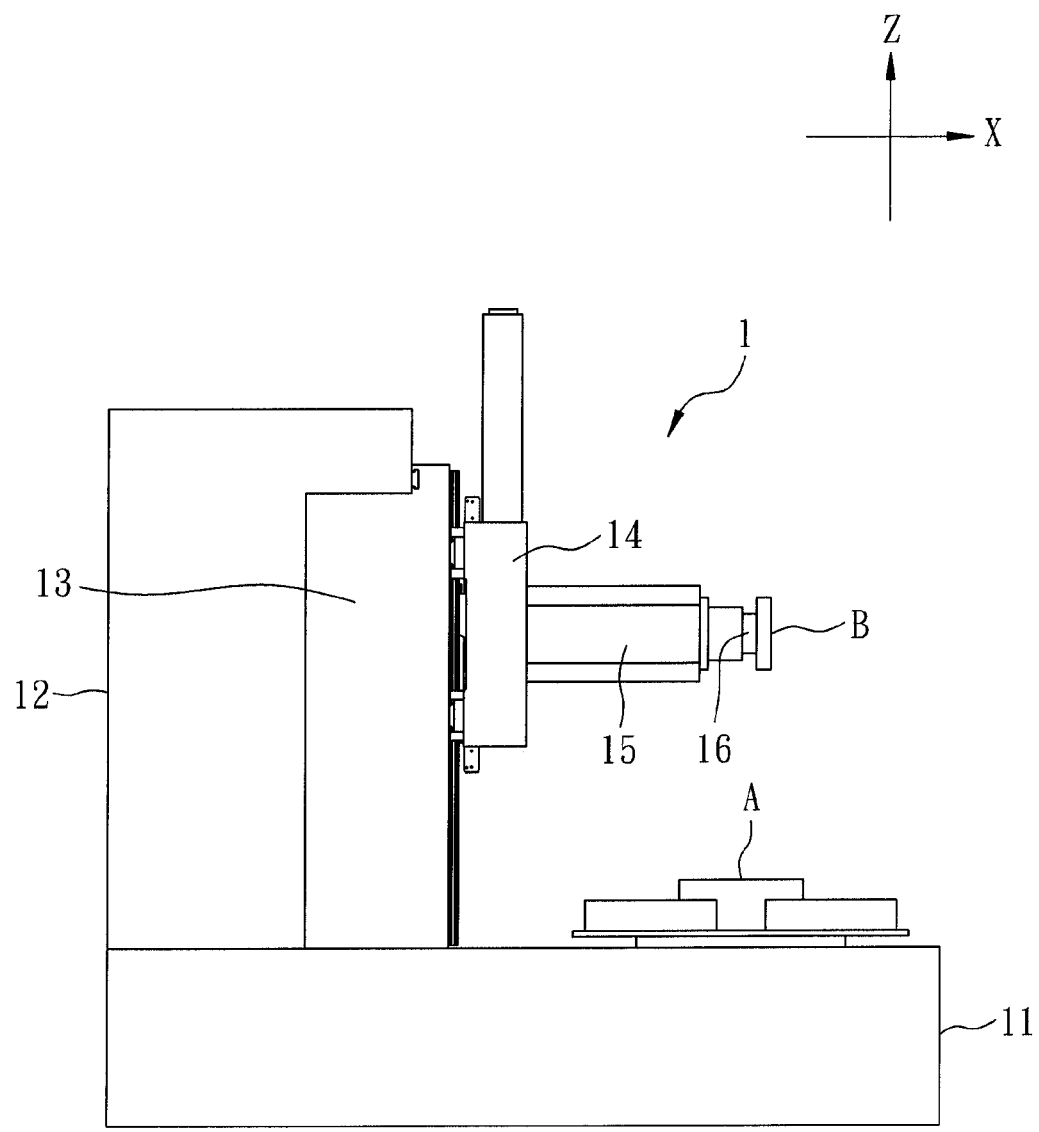
FIG. 1 is a side view of a conventional milling machine.
Figure 2:
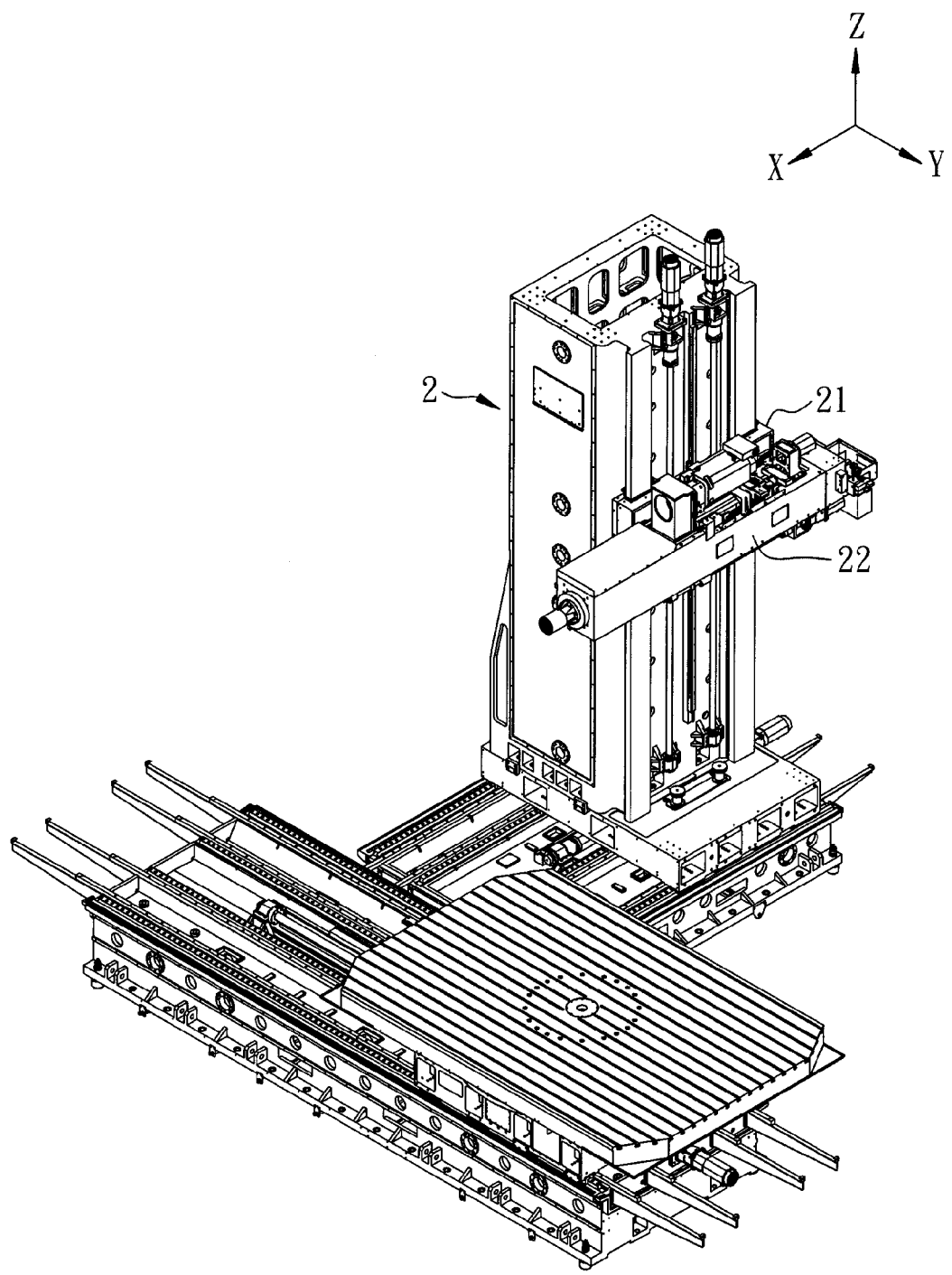
FIG. 2 is a perspective view of a milling machine provided with a deflection correction system, according to a preferred embodiment of the present invention.
Figure 3:
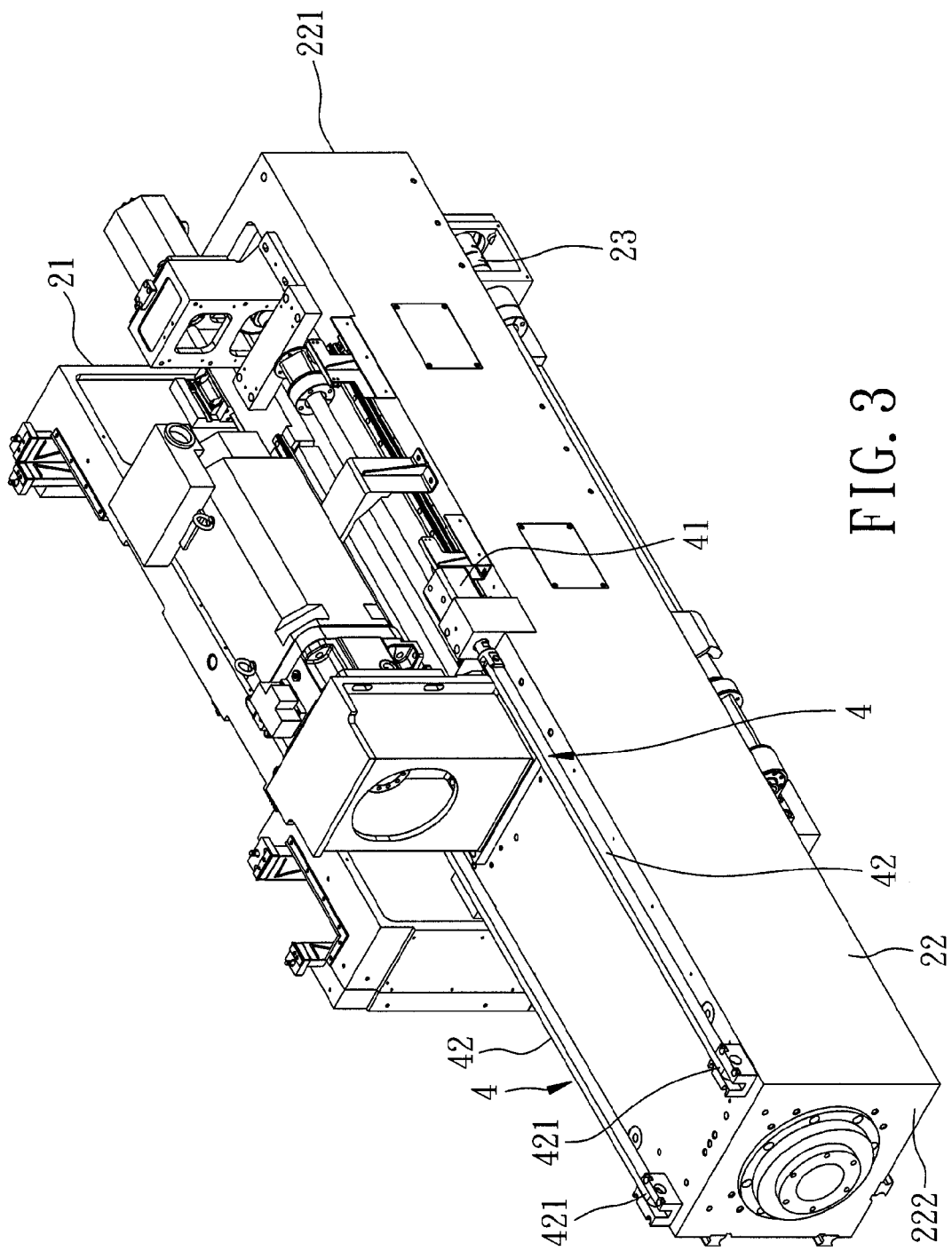
FIG. 3 is a perspective view of the preferred embodiment.
Figure 4:
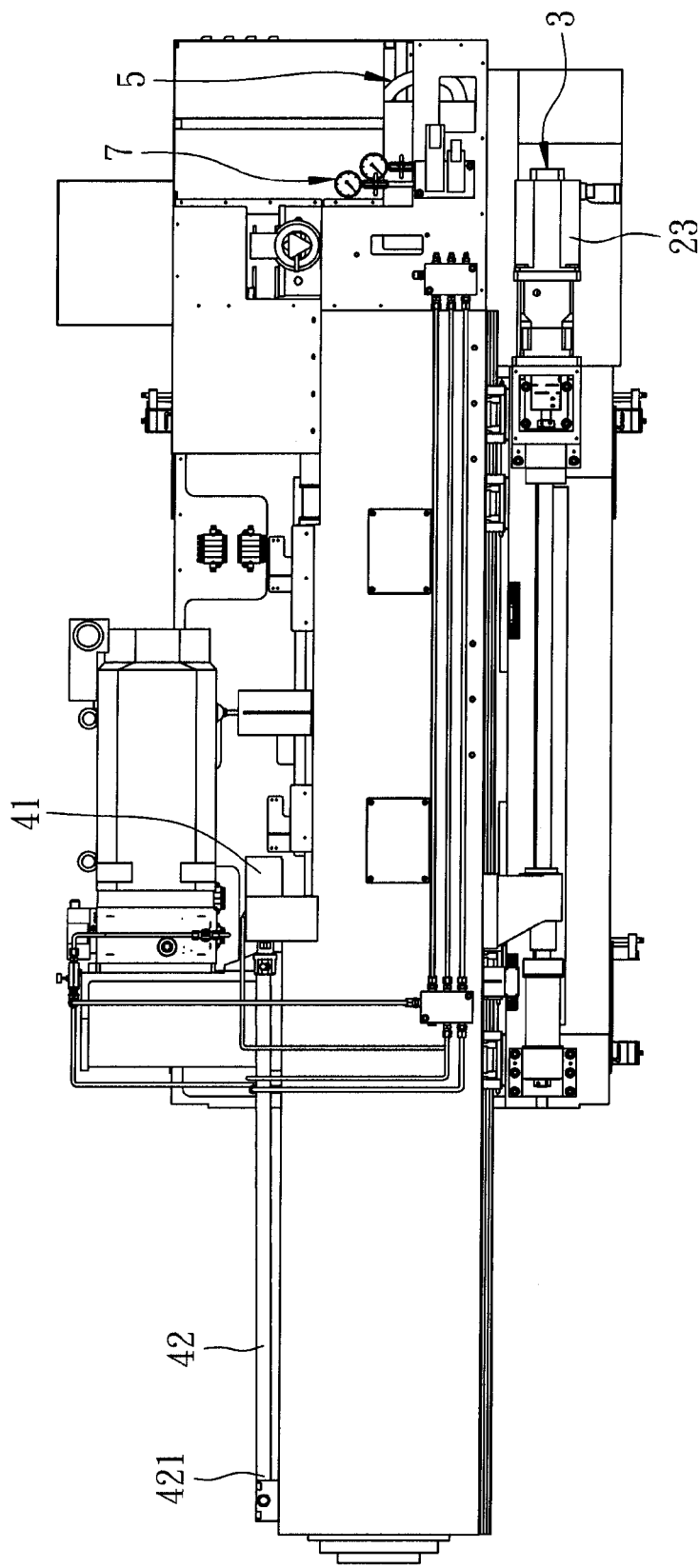
FIG. 4 is a side view of the preferred embodiment.
Figure 5:
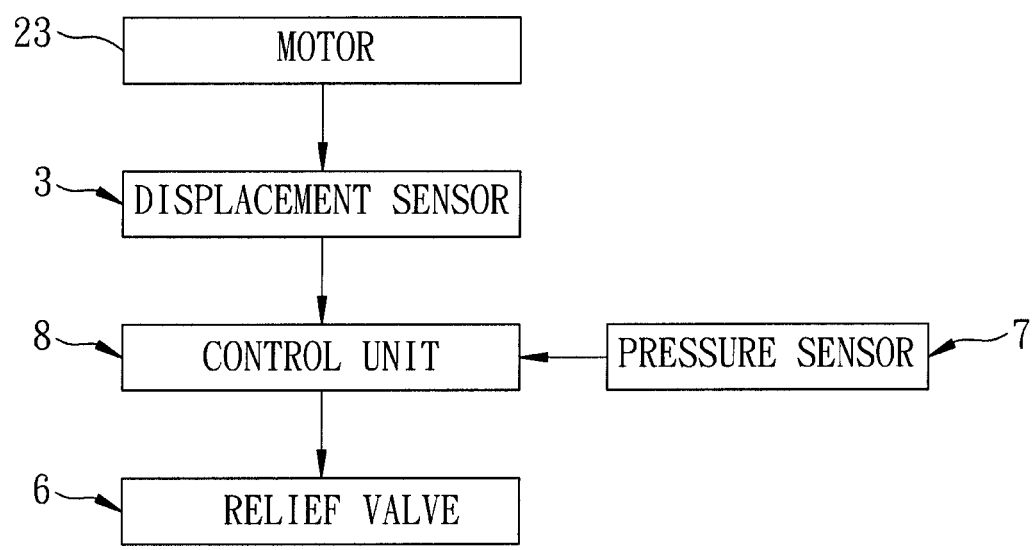
FIG. 5 is a block diagram of the preferred embodiment.
Figure 6:
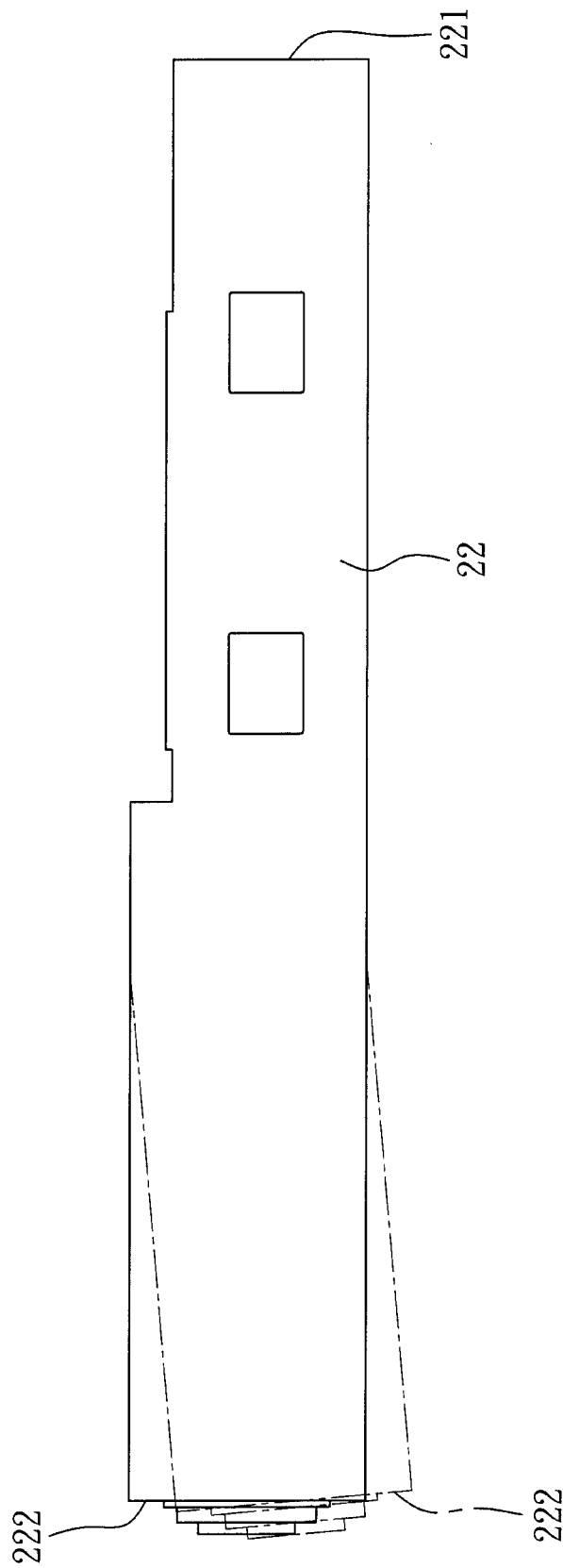
FIG. 6 is a schematic side view of the preferred embodiment illustrating deflection of the main spindle seat.

Referring to FIGS. 2, 3, 8A and 8B, the preferred embodiment of a deflection correction system according to the present invention is shown to be adapted to be mounted on a milling machine 2. The milling machine 2 has a carriage 21, a main spindle seat 22 moved by the carriage 21 and extending along an X-axis, and a motor 23 mounted on the carriage 21 coupled to the main spindle seat 22, and operable to drive displacement of the main spindle seat 22 relative to the carriage 21 along the X-axis. Referring further to FIGS. 4 and 5, the deflection correction system comprises: a displacement sensor 3, two pressure cylinders 4, a pipe unit 5, a relief valve 6, a pressure sensor 7, and a control unit 8.

In this embodiment, the displacement sensor 3 is an encoder mounted on the motor 23 that permits detection of the displacement of the main spindle seat 22 relative to the carriage 21 along the X-axis based on the rotation of the motor 23.

Each of the pressure cylinders 4 includes a cylinder body 41 fixed to the main spindle seat 22 and disposed proximate to a first end portion 221 of the main spindle seat 22.

Each pressure cylinder 4 further includes a control rod 42 extended retractably into the cylinder body 41. The pressure cylinder 4 is operable to move the control rod 42, and the control rod 42 has one rod end portion 421 distal from the cylinder body 41 and fixed to a second end portion 222 of the main spindle seat 22.

The pipe unit 5 is coupled to each cylinder body 41 and is configured to deliver fluid into and out of each cylinder body 41.

The relief valve 6 is connected to the pipe unit 5 and an oil tank (not shown) of hydraulic equipment to form a circulation loop for regulating the fluid flux in the pipe unit 5. The relief valve 6 is configured to open when receiving a compensation voltage having a first voltage value to reduce the fluid pressure in the pressure cylinders 4. The relief valve 6 is further configured to close when receiving the compensation voltage having a second voltage value to maintain the fluid pressure in the pressure cylinders 4.

The pressure sensor 7 senses the pressure of the fluid in the pressure cylinders 4. In this embodiment, the pressure sensor 7 is mounted on and connected to the pipe unit 5.

The control unit 8 is coupled electrically to the displacement sensor 3, the relief valve 6, and the pressure sensor 7 for determining a pressure range as a function of the displacement detected by the displacement sensor 3, and for outputting a compensation voltage (V) to control regulation of fluid pressure in the pressure cylinders 4 by the relief valve 6. In this embodiment, the default pressure value is set to (D), and the permitted error is set to (n). Hence, the pressure range is (D−n)~(D+n). The control unit 8 is configured to maintain the fluid pressure in the pressure cylinder 4 within the pressure range, thereby controlling the control rod 42 via the cylinder body 41 to position the second end portion 222 of the main spindle seat 22 relative to the X-axis. When the fluid pressure (P1) detected by the pressure sensor 7 is outside the pressure range, the control unit 8 adjusts the compensation voltage (V) to bring the fluid pressure (P1) within the pressure range.

In this embodiment, the steady state value of the fluid pressure (P1) and the compensation voltage (V) are proportional. When the control unit 8 outputs a minimum compensation voltage ($V_{min}$), the relief valve 6 is completely opened to discharge the fluid pressure (P1) in a front end portion 411 of the cylinder body 41 of each of the pressure cylinders 4. At this time, a rear end portion 412 of each cylinder body 41 is filled with fluid at pressure (P2), which moves each of the control rods 42 in a first direction along an X-axis (see FIG. 8B) to a protracted state. When a maximum compensation voltage ($V_{msc}$) is output, the relief valve 6 is completely closed to allow fluid to fill the front end portion 411 of the cylinder body 41 of each of the pressure cylinders 4. At this time, fluid pressure in the front end portion 411 of each cylinder body 41 is increased, which moves each of the control rods 42 in a second direction along the X-axis (see FIG. 8A) to a retracting state. Movement of the control rods 42 may be controlled by a pressure difference between P1 and P2.

Figure 7:
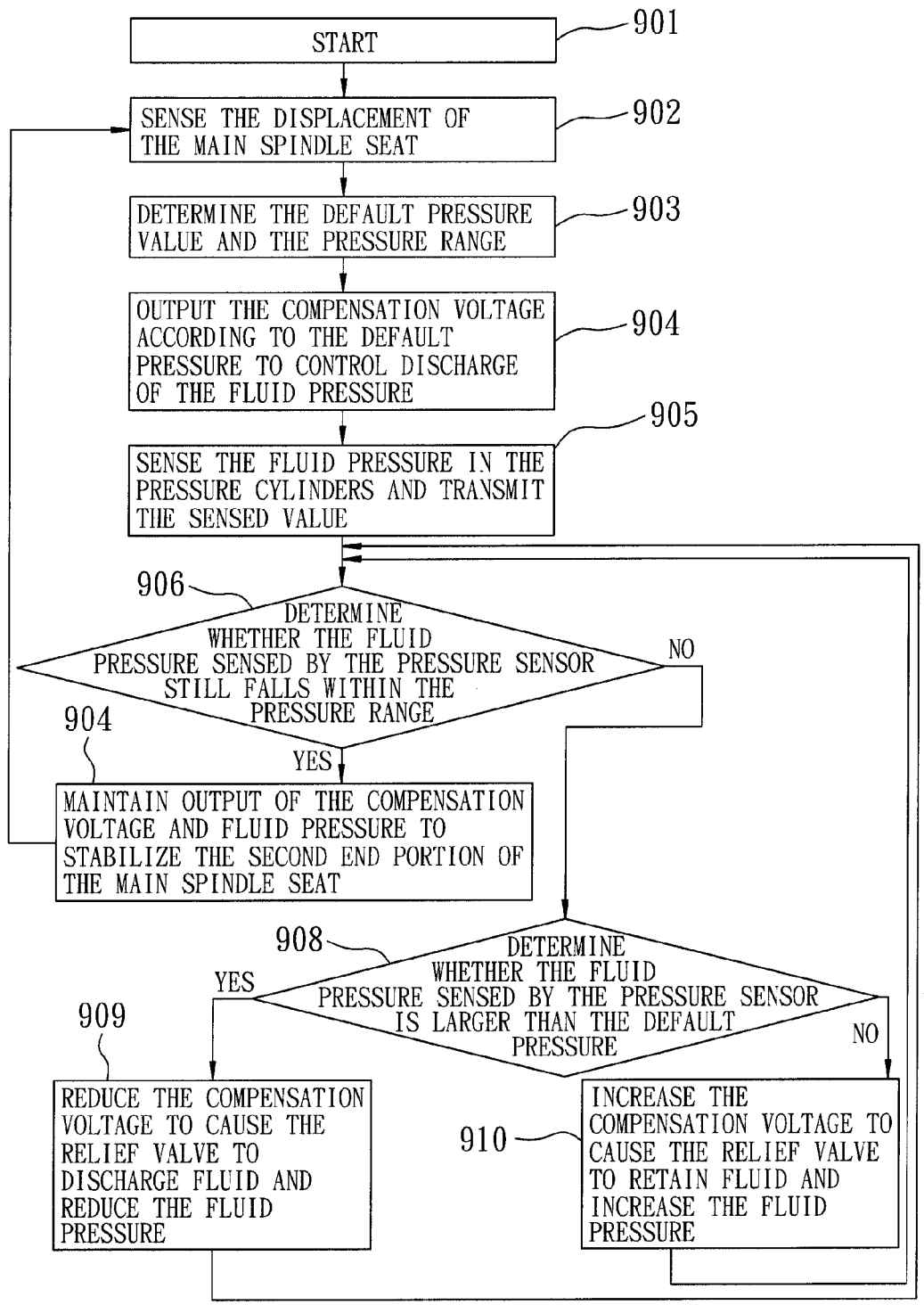
FIG. 7 is a flowchart to illustrate operation of the preferred embodiment.
Figure 8A:
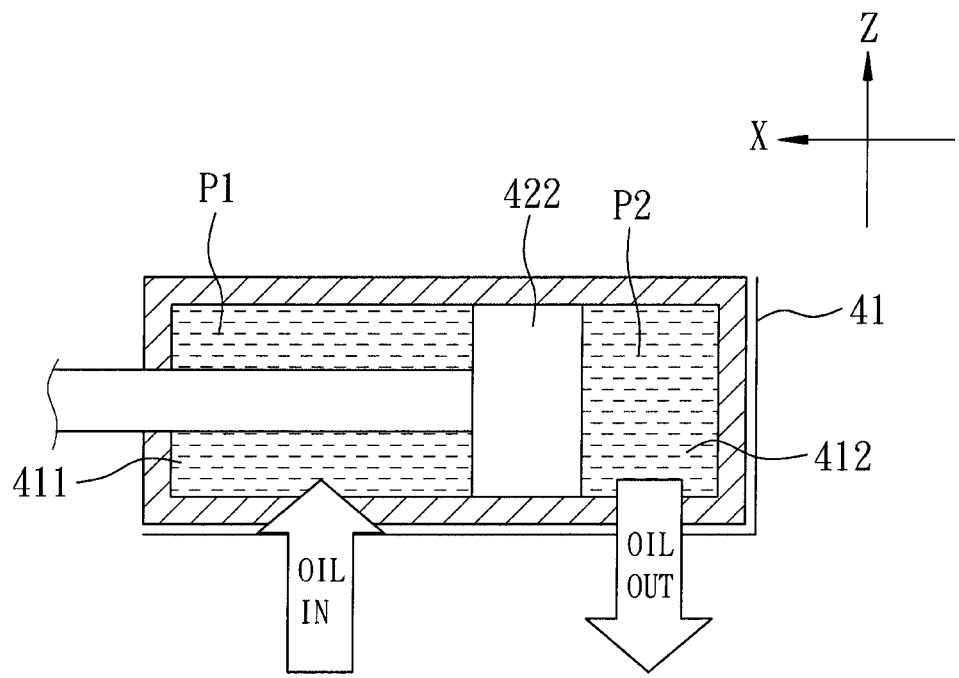
FIGS. 8A and 8B illustrate operation of a pressure cylinder of the preferred embodiment.
Figure 8B:
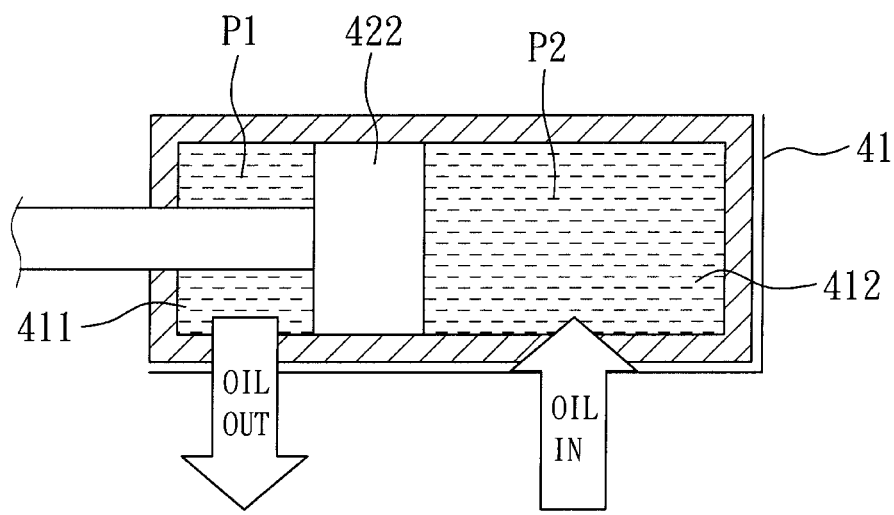

Referring to FIG. 7, the operation of this embodiment is as follows:

Step 901: The milling machine 2 is started.

Step 902: The displacement sensor 3 senses the displacement of the main spindle seat 22 relative to the carriage 21.

Step 903: Based on the sensed displacement, the control unit 8 determines the default pressure value (D), and the pressure range (D−n)~(D+n). The default pressure value (D) may be the pressure in the front end portion 411 of each cylinder body 41. For example, if D=10000 N/m$^2$ and n=1000 N/m$^2$, then the pressure range is 9000 N/m$^2$~11000 N/m$^2$. The aforementioned displacement and the default pressure value (D) may be predetermined and stored in the control unit 8.

Step 904: The control unit 8 outputs the compensation voltage (V) according to the default pressure value (D) to control discharge of the fluid pressure by the relief valve 6.

At this time, the pressure cylinders 4 receive the aforementioned fluid pressure (P1) and control the position of the control rods 42, which are connected to the second end portion 222 of the main spindle seat 22, to maintain the alignment of the main spindle seat 22 with the X-axis.

Step 905: The pressure sensor 7 senses the fluid pressure in the pressure cylinders 4 and transmits the sensed value to the control unit 8.

Step 906: Based on the default pressure value (D), the control unit 8 determines whether the fluid pressure sensed by the pressure sensor 7 still falls within the pressure range (D−n)~(D+n). If the result of the determination is affirmative, the process goes to step 907; otherwise the process goes to step 908.

Step 907: The control unit 8 maintains output of the same compensation voltage (V) and fluid pressure as applied in step 904 to stabilize the second end portion 222 of the main spindle seat 22 when the main spindle seat 22 is aligned with the X-axis. Afterwards, the process returns to step 902.

Step 908: The control unit 8 determines whether the fluid pressure sensed by the pressure sensor 7 is larger than the default pressure value (D). If the result of the determination is affirmative, the upward deflection of the main spindle seat 22 has been over compensated, and the process goes to step 909. If the result of the determination is negative, then the main spindle seat 22 is deflected downward, and the process goes to step 910.

Step 909: The control unit 8 reduces the compensation voltage (V) to cause the relief valve 6 to discharge fluid and reduce the fluid pressure, such as by 500 N/m$^2$. Afterwards, the process returns to step 905.

At this time, the control rods 42 are protracted by the cylinder bodies 41, which permits the second end portion 222 of the main spindle seat 22 to deflect downward. In an embodiment, for each reduction of the fluid pressure by 500 N/m$^2$, the second end portion 222 of the main spindle seat 22 deflects downward by 0.1 μm.

Step 910: The control unit 8 increases the compensation voltage (V) to cause the relief valve 6 to retain fluid and increase the fluid pressure, such as by 500 N/m$^2$. Afterwards, the process returns to step 905.

At this time, the control rods 42 are retracted by the cylinder bodies 41. As a result, the control rods 42 pull the second end portion 222 of the main spindle seat 22 and deflect the second end portion 222 upward. In an embodiment, each increase of the fluid pressure by 500 N/m$^2$ deflects the second end portion 222 of the main spindle seat 22 upward by 0.1 μm.

The foregoing steps are repeated until the milling machine 2 is powered off and the operation is stopped.

From the foregoing, an advantage of the deflection correction system for a milling machine 2 according to this invention includes increasing manufacturing precision by controlling pressure within the pressure cylinder 4 in accordance with the displacement of the main spindle seat 22 along the X-axis to position the second end portion 222 of the main spindle seat 22 relative to the X-axis.

While the present invention has been described in connection with what is considered the most practical and preferred embodiment, it is understood that this invention is not limited to the disclosed embodiment but is intended to cover various arrangements included within the spirit and scope of the broadest interpretation to encompass all such modifications and equivalent arrangements.

What is claimed is:

1. A deflection correction system for a milling machine, the milling machine having a carriage, a main spindle seat mounted on the carriage and extending along an axis, and a motor mounted on the carriage, coupled to the main spindle seat, and operable to drive displacement of the main spindle seat relative to the carriage along the axis, said deflection correction system comprising:

a control unit;

a displacement sensor coupled electrically to said control unit and configured to detect displacement of the main spindle seat relative to the carriage along the axis;

at least one pressure cylinder including
a cylinder body to be fixed to the main spindle seat and to be disposed proximate to a first end portion of the main spindle seat, and
a control rod extended retractably into said cylinder body, said pressure cylinder being operable to move said control rod, said control rod having a rod end portion distal from said cylinder body and to be fixed to a second end portion of the main spindle seat; and a pressure sensor electrically coupled to said control unit and configured to detect fluid pressure in said pressure cylinder;

wherein said control unit is configured to determine a pressure range as a function of the displacement detected by said displacement sensor, and to maintain the fluid pressure in said pressure cylinder within the pressure range, thereby controlling said control rod via said cylinder body to position the second end portion of the main spindle seat relative to the axis.

2. The deflection correction system for a milling machine as claimed in claim 1, wherein said displacement sensor includes an encoder to be coupled to the motor.

3. The deflection correction system for a milling machine as claimed in claim 1, further comprising a pipe unit coupled to said cylinder body and configured to deliver fluid into and out of said cylinder body.

4. The deflection correction system for a milling machine as claimed in claim 3, further comprising a relief valve coupled to said pipe unit and coupled electrically to said control unit, said relief valve being controlled by said control unit to regulate fluid pressure in said pipe unit.

5. The deflection correction system for a milling machine as claimed in claim 4, wherein said control unit outputs a compensation voltage to control regulation of fluid pressure by said relief valve, said relief valve being configured to open when receiving a compensation voltage having a first voltage value to reduce the fluid pressure in said pressure cylinder, and to close when receiving the compensation voltage having a second voltage value to maintain the fluid pressure in said pressure cylinder.

6. The deflection correction system for a milling machine as claimed in claim 5, wherein the fluid pressure is proportional to the compensation voltage.

7. The deflection correction system for a milling machine as claimed in claim 5, wherein the pressure range is defined as a default pressure value plus or minus a tolerance value.

8. The deflection correction system for a milling machine as claimed in claim 7, wherein, when the fluid pressure detected by said pressure sensor is outside the pressure range, said control unit adjusts the compensation voltage to bring the fluid pressure in said pressure cylinder within the pressure range.

9. The deflection correction system for a milling machine as claimed in claim 3, wherein said pressure sensor is mounted on and connected to said pipe unit.

* * * * *